Patented Oct. 21, 1941

2,260,248

UNITED STATES PATENT OFFICE 2,260,248

METHOD OF STABILIZING NITRO-
CELLULOSE

Carl B. Gilbert, South River, N. J., assignor to
Hercules Powder Company, Wilmington, Del.,
a corporation of Delaware No Drawing. Application November 2, 1939,
Serial No. 302,567

13 Claims. (Cl. 260—223)

This invention relates to an improved method for incorporating color stabilizers in nitrocellulose, and more particularly to incorporation of color stabilizers in solid forms of nitrocellulose.

The use of small quantities of phosphoric acid has been suggested for stabilizing the color of nitrocellulose lacquers, base solutions, etc. The phosphoric acid could be added to the lacquer or to the nitrocellulose per se. The latter course is the more advantageous since successful stabilization is dependent upon accurate proportioning of the phosphoric acid to the nitrocellulose. However, no satisfactory method of distributing acids in nitrocellulose in the usual fibrous alcohol-wet form in which it is stored and shipped has heretofore been known.

The concentration of the acid color stabilizer is critical, the safe and effective range being narrow. Below a certain level, phosphoric acid is ineffective in preventing discoloration. Above a certain level, there is a sharp drop in chemical stability or heat stability measured, for example, by the German test. Furthermore, too much acid in a lacquer solution may result in excessive corrosion of containers, gassing of the lacquer solution, tarnishing or darkening of aluminum or bronze powders, or blooming of the lacquer film because of the formation of insoluble metallic salts by the acid in the film.

It is essential to distribute the color stabilizing acid uniformly throughout the nitrocellulose so that the color stabilizing effect is obtained without local over-concentration of the acid which would destroy the chemical stability locally and thereby contaminate the batch with unsuitable material.

Now it is an object of this invention to provide a method of uniformly incorporating small quantities of color stabilizing acid in solid nitrocellulose, the stabilizer being present in at least effective concentration in all portions of the nitrocellulose but not in excess of a safe concentration in any portion.

It is a further object to provide a method of obtaining nitrocellulose in the solid form which has been safely and effectively treated with an acid color stabilizer.

Other objects will appear as this invention is described.

These objects are attained, in accordance with this invention, by percolating a dilute solution of phosphoric acid through a porous mass of nitrocellulose until an effective but safe acid content is established in all portions of the mass. The concentration of the phosphoric acid in the dilute solution is maintained at a level less than the maximum desired local concentration of acid in the final solution wet nitrocellulose mass, calculated on the basis of the liquid in the mass. The dilute solution is percolated through the mass preferably at a fairly rapid rate until the concentration of the acid in all parts of the mass is above the minimum required for effective color stabilizing action. Percolation is stopped before the concentration of the acid in any part of the mass attains a quantity sufficient to cause any appreciable loss in chemical or heat stability.

It has been found that fibrous nitrocellulose adsorbs phosphoric acid from the dilute solution, stripping acid from the solvent. Absolute uniformity throughout the mass is probably not obtained. However, it is now possible to obtain a mass of nitrocellulose in which an effective but safe quantity of stabilizer exists in all portions. By the method of this invention, the difficulties due to local over-concentration produced when a solution of phosphoric acid is mixed with solid nitrocellulose are averted. Similarly, excessive over-concentration of acid in one part of the nitrocellulose and under-concentration in another part encountered if a percolating solution contains acid in the concentration desired in the liquid of the final treated nitrocellulose is also averted.

The solvent utilized in the method of this invention may be any inert liquid which is a solvent for phosphoric acid, which does not dissolve nitrocellulose, and which may be left with the nitrocellulose in the wet mass formed. Lower aliphatic alcohols, for example, ethanol, propanol, butanol, isopropanol, isobutanol, amyl alcohol, etc. or other solvents of the stabilizer such as water, benzene, toluene, xylene, mixtures with an alcohol, etc. are suitable. The concentration of phosphoric acid in the solvent employed may vary considerably according to how much solvent it is desired to percolate through the nitrocellulose. The concentration may, for example, be in the range from about 0.01% to about 0.30%, preferably in the range from about 0.014% to about 0.14%, the percentages being by weight.

The method in accordance with this invention may be applied to solid nitrocellulose in the usual fibrous form, or as nitrated cellulose sheet, tissue, cut or shredded sheet, foil, etc. The nitrocellulose to be treated may be in the dry form, water-wet, ethanol-wet, butanol-wet, etc. Conveniently, the method is applied to water-wet fibrous nitrocellulose which has been washed free of any adhering or loosely combined nitrating acids, and which has been treated in the usual manner to obtain satisfactory chemical or heat stability as measured by the German test or the like. Conveniently, the method in accordance with this invention is combined with the dehydration step usual in nitrocellulose manufacture.

Water-wet, purified, and stabilized nitrocellulose may be placed, for example, in a dehydrating press and excess water removed by pressing. A dilute solution of phosphoric acid, for example, in a lower aliphatic alcohol is then percolated through the compressed mass. Sufficient of this alcohol solution is pumped through the mass so that there is attained in all portions of the mass a concentration of phosphoric acid in the range between about 0.01% and about 0.20% based on the weight of the dry nitrocellulose in the portion considered. Usually a quantity of alcoholic phosphoric acid solution about 1½ times to about 4 times by weight of the nitrocellulose on the dry basis is sufficient to accomplish the desired result. It will be appreciated that the exact quantity depends upon the concentration of the phosphoric acid in the alcohol. Preferably, the phosphoric acid solution is pumped rapidly through the compressed mass. Excess alcohol may be removed if desired by increasing the pressure on the wet mass when percolation has been completed.

In a specific example of procedure in accordance with this invention, a mass of ¼ second viscosity lacquer type fibrous nitrocellulose, washed free of adhering acids and stabilized in the usual manner and drained to a water content of about 60%, was placed in a dehydrating press. A pressure of 300 lbs./sq. in. was then applied to remove excess water. While still under this pressure, 1.8 parts by weight of a 0.014% phosphoric acid solution in ethanol for each part by weight of nitrocellulose (dry basis) were pumped into the mass of nitrocellulose at the top of the mass. Additional pressure was then applied until the alcohol-wet mass was pressed to a nitrocellulose content of approximately 75% by weight. Analysis of portions of the block of nitrocellulose so obtained gave the following results:

| | Volatile matter percent of wet mass | $H_3PO_4$ percent of wet mass | $H_3PO_4$ percent of dry-NC |
|---|---|---|---|
| At top of block | 26.8 | 0.014 | 0.019 |
| At middle of block | 23.7 | 0.014 | 0.018 |
| At bottom of block | 21.5 | 0.011 | 0.014 |

The method in accordance with this invention has been described as applying to the distribution of phosphoric acid in nitrocellulose as phosphoric acid is outstanding as a nitrocellulose color stabilizer. However, this method is also applicable to the incorporation of other acid color stabilizers, for example, such polybasic acids as citric, tartaric, oxalic, malic, succinic, arsenic and arsenous acids; also appropriate acid salts and acid esters such as mono sodium phosphate, mono potassium phosphate, monoethyl phosphate, mono butyl phosphate, mono ethyl citrate, mono butyl citrate, etc. These acid stabilizers may be used similarly to phosphoric acid employing at least quantities of equivalent free acidity.

The method in accordance with this invention not only provides optimum and safe automatic adjustment of the quantity of color stabilizer in lacquers and base solutions prepared from the treated nitrocellulose, but provides in addition uniform and safe distribution of the acid in Celluloid and similar plastics which are never in a solution stage. Further, it provides a method for stabilizing the color of the solid nitrocellulose itself during shipment and storage before use by now incorporating an acidic stabilizer without, in any portion of the material, reducing heat stability to an unsafe value. Thus an effective concentration of color stabilizer, i. e. phosphoric acid, above 0.01% of the dry nitrocellulose but still a safe concentration, i. e. insufficient to cause the nitrocellulose to have a heat stability by the German test (in which the nitrocellulose is heated at 135° C.) below 20 minutes, is achieved in all portions of solid nitrocellulose intended for any use.

It will be understood that the details and examples hereinbefore set forth are illustrative only, and that the invention as broadly described and claimed is in no way limited thereby.

What I claim and desire to protect by Letters Patent is:

1. A method for incorporating an acidic color stabilizer in wet nitrated cellulose which comprises percolating a solution of an acid color stabilizer, in a solution concentration between about 0.01% and about 0.30% by weight calculated as phosphoric acid of equivalent free acidity in an inert liquid which is a solvent for the stabilizer and which does not dissolve nitrocellulose, the said concentration being less than the maximum concentration ultimately obtained in the treated wet nitrated cellulose on the basis of the liquid remaining therewith, through a porous mass of heat-stable nitrated cellulose, until there is attained in all portions of the resulting nitrated cellulose mass a concentration of the acidic material between about 0.01% and about 0.20% by weight of the nitrated cellulose, the concentration being calculated as phosphoric acid of equivalent free acidity.

2. A method for incorporating an acidic color stabilizer in wet nitrated cellulose which comprises compressing a fibrous mass of nitrated cellulose and percolating a solution of an acid color stabilizer through the compressed mass, the stabilizer being in a solution concentration between about 0.01% and about 0.30% by weight calculated as phosphoric acid of equivalent free acidity in an inert liquid which is a solvent for the stabilizer and which does not dissolve nitrocellulose, the said concentration being less than the maximum concentration ultimately obtained in the treated wet nitrated cellulose on the basis of the liquid remaining therewith, until there is attained in all portions of the resulting nitrated cellulose mass a concentration of the acidic material between about 0.01% and about 0.20% by weight of the nitrated cellulose, the concentration being calculated as phosphoric acid of equivalent free acidity.

3. A method for incorporating an acidic color stabilizer in wet nitrated cellulose which comprises percolating a solution of an acid color stabilizer, in a solution concentration between about 0.01% and about 0.30% by weight calculated as phosphoric acid of equivalent free acidity in an inert liquid which is a solvent for the stabilizer and which does not dissolve nitrocellulose, the said concentration being less than the maximum concentration ultimately obtained in the treated wet nitrated cellulose on the basis of the liquid remaining therewith, through a porous mass of heat-stable nitrated cellulose, until there is attained in all portions of the mass at least the desired concentration of stabilizer and compressing the mass to an extent removing excess liquid but leaving stabilizer in the mass in a concentration which in all portions thereof is between about 0.01% and about 0.20% by weight of the nitrated cellulose, the concentration being calculated as phosphoric acid of equivalent free acidity.

4. A method for incorporating an acidic color stabilizer in wet nitrated cellulose which comprises compressing a fibrous mass of nitrated cellulose and percolating a solution of an acid color stabilizer through the compressed mass, the stabilizer being in a solution concentration between about 0.01% and about 0.30% by weight calculated as phosphoric acid of equivalent free acidity in an inert liquid which is a solvent for the stabilizer and which does not dissolve nitrocellulose, the said concentration being less than the maximum concentration ultimately obtained in the treated wet nitrated cellulose on the basis of the liquid remaining therewith, until there is attained in all portions of the mass at least the desired concentration of stabilizer, and further compressing the mass to an extent removing excess liquid but leaving stabilizer in the mass in a concentration which in all portions of the mass is between about 0.01% and about 0.20% by weight of the nitrated cellulose, the concentration being calculated as phosphoric acid of equivalent free acidity.

5. A method for incorporating an acidic color stabilizer in wet nitrated cellulose which comprises percolating a solution of phosphoric acid in an inert liquid which is a solvent for phosphoric acid and which does not dissolve nitrocellulose, the concentration of the phosphoric acid being between about 0.01% and about 0.30% by weight of the solution and being less than the maximum concentration uitmately obtained in the treated wet nitrated cellulose on the basis of the liquid remaining therewith, through a porous mass of heat-stable nitrated cellulose, until there is attained in all portions of the resulting mass a concentration of phosphoric acid between about 0.01% and about 0.20% by weight of the nitrated cellulose.

6. A method for incorporating an acid color stabilizer in wet nitrated cellulose which comprises percolating a solution of citric acid in an inert liquid which is a solvent therefor and which does not dissolve nitrocellulose, the concentration of the citric acid being between about 0.01% and about 0.30% by weight calculated as phosphoric acid of equivalent free acidity and being less than the concentration ultimately obtained in the treated wet nitrated cellulose on the basis of the liquid remaining therewith, through a porous mass of heat-stable nitrated cellulose, until there is attained in all portions of the resulting nitrated cellulose mass a concentration of the citric acid between about 0.01% and about 0.20% by weight of the nitrated cellulose, the concentration being calculated as phosphoric acid of equivalent free acidity.

7. A method for incorporating an acid color stabilizer in wet nitrated cellulose which comprises percolating a solution of tartaric acid in an inert liquid which is a solvent therefor and which does not dissolve nitrocellulose, the concentration of the tartaric acid being between about 0.01% and about 0.30% by weight calculated as phosphoric acid of equivalent free acidity and being less than the maximum concentration ultimately obtained in the treated wet nitrated cellulose on the basis of the liquid remaining therewith, through a porous mass of heat-stable nitrated cellulose, until there is attained in all portions of the resulting nitrated cellulose mass a concentration of the tartaric acid between about 0.01% and about 0.20% by weight of the nitrated cellulose, the concentration being calculated as phosphoric acid of equivalent free acidity.

8. A method for incorporating an acidic color stabilizer in wet nitrated cellulose which comprises percolating a solution of phosphoric acid in a lower aliphatic alcohol which is a solvent for the phosphoric acid and which does not dissolve the nitrocellulose, the concentration of the phosphoric acid being between about 0.01% and about 0.30% by weight of the solution and being less than the concentration ultimately obtained in the treated wet nitrated cellulose on the basis of the liquid remaining therewith, through a porous mass of heat-stable nitrated cellulose, until there is attained in all portions of the resulting mass a concentration of phosphoric acid between about 0.01% and about 0.20% by weight of the nitrated cellulose.

9. A method for incorporating an acidic color stabilizer in wet nitrated cellulose which comprises compressing a fibrous mass of nitrated cellulose and percolating a solution of phosphoric acid in ethyl alcohol through the compressed mass, the phosphoric acid being in a concentration in the alcohol between about 0.01% and about 0.30% by weight and being less than the concentration ultimately obtained in the treated wet nitrated cellulose on the basis of the liquid remaining therewith, until there is attained in all portions of the resulting nitrated cellulose mass a concentration of phosphoric acid between about 0.01% and about 0.20% by weight of the nitrated cellulose.

10. A method for incorporating an acidic color stabilizer in wet nitrated cellulose which comprises compressing a fibrous mass of nitrated cellulose and percolating a solution of phosphoric acid in isopropyl alcohol through the compressed mass, the phosphoric acid being in a concentration in the alcohol between about 0.01% and about 0.30% by weight and being less than the concentration ultimately obtained in the treated wet nitrated cellulose on the basis of the liquid remaining therewith, until there is attained in all portions of the resulting nitrated cellulose mass a concentration of phosphoric acid between about 0.01% and about 0.20% by weight of the nitrated cellulose.

11. A method for incorporating an acidic color stabilizer in wet nitrated cellulose which comprises compressing a fibrous mass of nitrated cellulose and percolating a solution of phosphoric acid in butyl alcohol through the compressed mass, the phosphoric acid being in a concentration in the alcohol between about 0.01% and about 0.30% by weight and being less than the concentration ultimately obtained in the treated wet nitrated cellulose on the basis of the liquid remaining therewith, until there is attained in all portions of the resulting nitrated cellulose mass a concentration of phosphoric acid between about 0.01% and about 0.20% by weight of the nitrated cellulose.

12. A method for incorporating an acidic color stabilizer in wet nitrated cellulose which comprises compressing a water-wet fibrous mass of nitrated cellulose, percolating a solution of phosphoric acid in ethyl alcohol through the compressed mass, the concentration of phosphoric acid in the alcohol being between about 0.01% and about 0.30% by weight and being less than the maximum concentration ultimately obtained in the treated wet nitrated cellulose on the basis of the liquid remaining therewith, until there is attained in all portions of the mass at least the desired concentration of phosphoric acid, and further compressing the mass to an extent removing excess liquid but leaving phosphoric acid in the mass in a concentration which in all portions is between about 0.01% and about 0.20% by weight of the nitrated cellulose.

13. A method for incorporating an acidic color stabilizer in wet nitrated cellulose which comprises compressing a water-wet fibrous mass of nitrated cellulose at a pressure of about 300 pounds per square inch to remove excess water, percolating through the compressed mass a solution of phosphoric acid in ethyl alcohol, the said solution having a concentration of phosphoric acid between about 0.01% and about 0.30% by weight, until the concentration of phosphoric acid in all portions of the compressed mass is at least 0.01% by weight of the nitrated cellulose, and applying additional pressure to remove excess solution, until the nitrated cellulose content of the resulting alcohol-wet mass becomes approximately 75%, and the concentration of phosphoric acid in all portions of the mass is between about 0.01% and about 0.20% by weight of the nitrated cellulose.

CARL B. GILBERT.